Sept. 20, 1960     J. H. INGERSOLL     2,952,895
METHOD OF MAKING AN AGRICULTURAL DISC
Original Filed Jan. 26, 1956     4 Sheets-Sheet 1
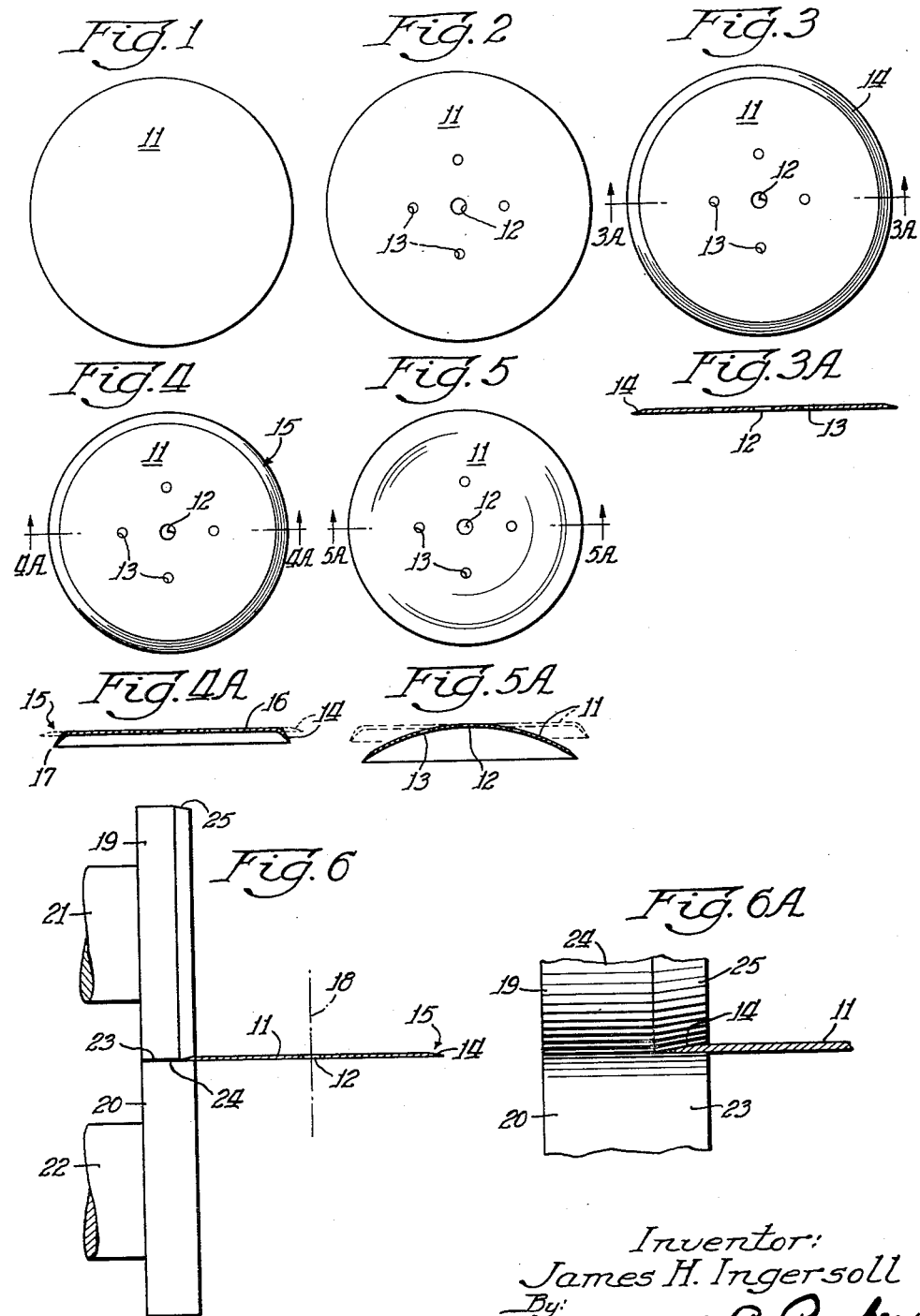
Inventor:
James H. Ingersoll
By: Frank C. Parker, Atty.

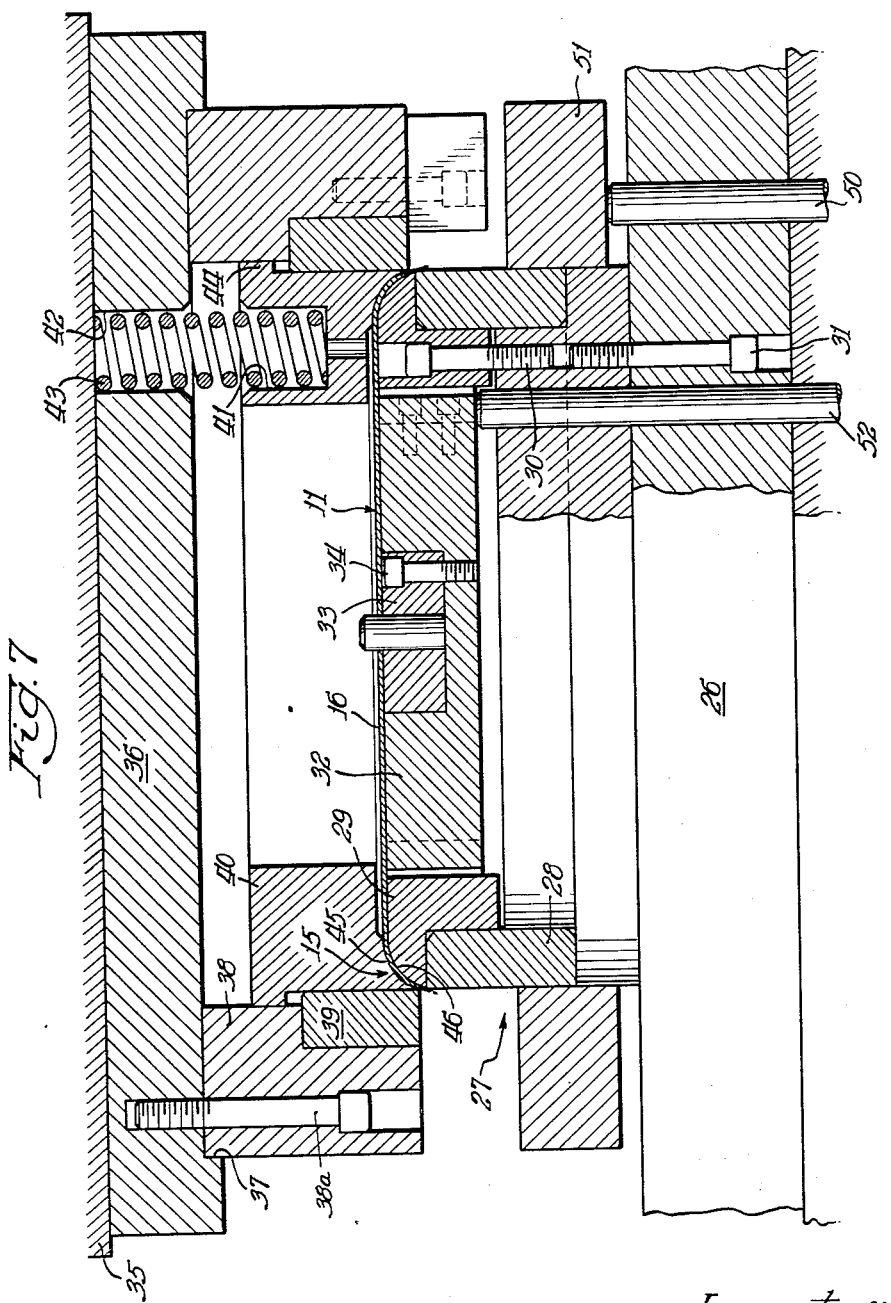

Sept. 20, 1960     J. H. INGERSOLL     2,952,895
METHOD OF MAKING AN AGRICULTURAL DISC
Original Filed Jan. 26, 1956     4 Sheets-Sheet 3
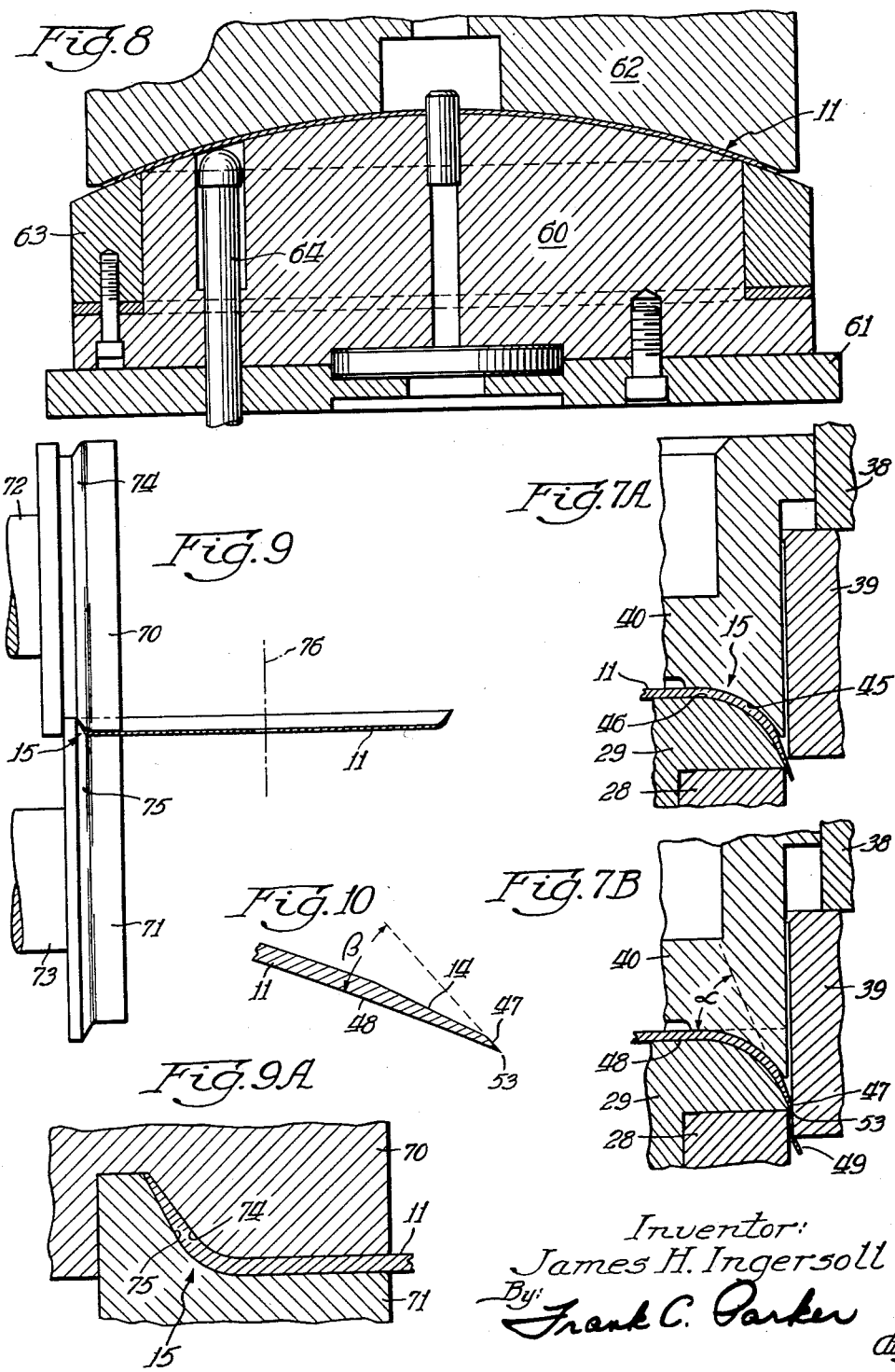
Inventor:
James H. Ingersoll
By: Frank C. Parker
Atty.

Sept. 20, 1960   J. H. INGERSOLL   2,952,895
METHOD OF MAKING AN AGRICULTURAL DISC
Original Filed Jan. 26, 1956   4 Sheets-Sheet 4
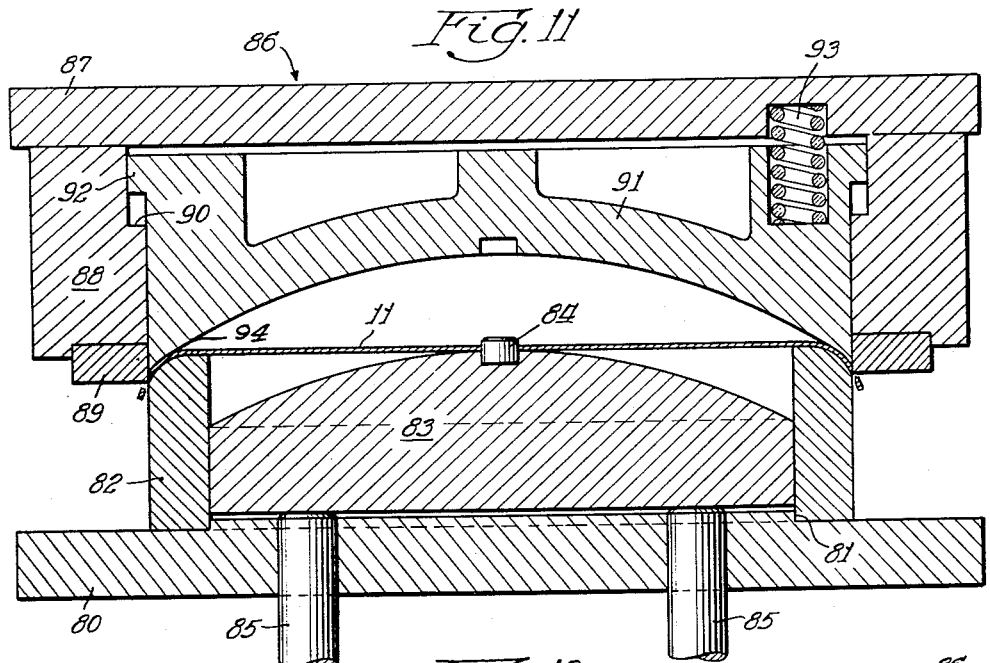
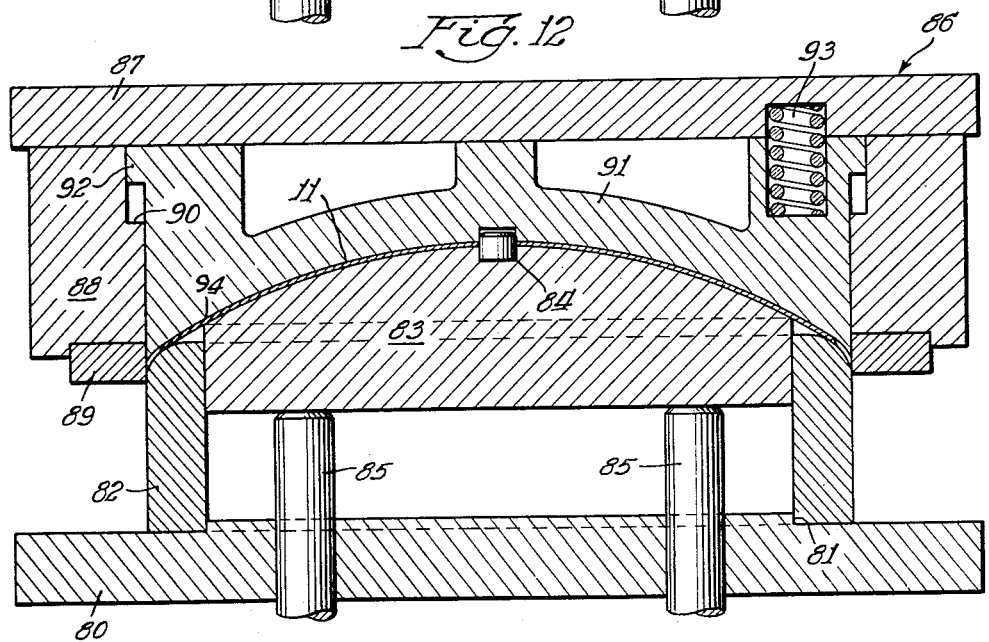
Inventor:
James H. Ingersoll
By: Frank C. Parker
Atty.

United States Patent Office 2,952,895
Patented Sept. 20, 1960

2,952,895

METHOD OF MAKING AN AGRICULTURAL DISC

James H. Ingersoll, Winnetka, Ill., assignor to Borg-Warner Corporation, Chicago, Ill., a corporation of Illinois Original application Jan. 26, 1956, Ser. No. 561,595. Divided and this application Mar. 13, 1957, Ser. No. 645,704

8 Claims. (Cl. 29—14)

The present invention relates in its broadest aspects to a method of making sheet metal articles and more specifically and improved sheet steel earth working disc particularly applicable to agricultural implements.

This application is a division of the copending application of J. H. Ingersoll, Serial No. 561,595, filed January 26, 1956.

For a considerable period of time it has been rather common practice to utilize agricultural implements for working the soil comprising concave sheet steel discs formed with a tapered peripheral region having a ground edge therearound for providing a suitable earth cutting edge around the disc. The conventional method of manufacturing earth working discs utilizes a grinding operation for the purpose of providing the relatively sharp periphery of the disc, and this method is not without drawbacks.

When the agricultural discs are peripherally ground to provide the cutting edge therearound, the friction during the grinding operation between the grinding wheel and the edge of the disc is sufficient to heat the edge of the disc and in many instances this frictional heating actually changes the metallurgical characteristics of the metal around the disc periphery. Because of the fact that the grinding period is not a fixed interval time, and because the actual temperature of the metal at the periphery of the disc is also a function of the thickness of the metal in contact with the grinding wheel, there is usually a temperature gradient from a high value at the sharpest point on the periphery toward the center of the disc. As a result of this temperature gradient, the subsequent cooling, due to what may be termed air quenching, causes a gradient in the hardness of the cutting edges, which is present in a high percentage of earth cutting discs manufactured in a conventional manner.

Quite often the grinding wheels used to sharpen the peripheries of agricultural discs are so rough that they form resultant ridges and valleys along the ground peripheral surface of the discs. Due to this condition stress concentrations are formed which have been known to cause breakage of the discs when the discs are put into use. The present invention, by eliminating grinding of the disc edges, therefore overcomes this inherent drawback of agricultural discs manufactured by conventional methods employing a grinding operation.

The present invention therefore has, as one of its principal objects, the provision of a method for making an earth working disc which omits there inherent undesirable steps conventially employed when the cutting edges around the discs are formed by grinding.

A further object of the present invention is to provide a method for making earth working discs wherein the cutting edges therearound are formed by a single shearing operation.

More particularly, the present invention contemplates the over-forming of the peripheral region of the disc blanks, shearing the edge of the over-formed blank by a single operation of a pair of complementary die members, and the subsequent reshaping of the entire disc blank to impart the desired final curvature to the disc.

It is contemplated that the initial over-forming operation may be carried out either by complementary edge rolls or by complementary dies.

The above general objects and advantages, as well as others, will become apparent from the following detailed description when read in conjunction with the accompanying drawings, wherein:

Figs. 1–5 schematically represent the method steps of a preferred embodiment of the present invention, Fig. 1 representing a plan view of a disc blank, Fig. 2 representing the disc blank having the center and locating holes formed therein; Figs. 3 and 3a respectively representing plan and sectional views of the disc blank after the periphery thereof is subjected to an edge rolling operation to provide an initial taper around the periphery of the blank, Figs. 4 and 4a respectively representing plan and sectional views of the disc blank after it has been subjected to a die forming operation in order to upset the periphery of the blank and after the blank has been peripherally sheared in order to provide the cutting edge therearound, and Figs. 5 and 5a, respectively, representing the disc after it has been subjected to a reforming operation to impart the desired curvature thereto;

Fig. 6 is a schematic view illustrating the edge rolling operation on the periphery of the disc to provide a taper on one side thereof;

Fig. 6a is an enlarged fragmentary view of the edge rolling operation shown in Fig. 6;

Fig. 7 is a side elevational view, shown generally in section, of a die arrangement in a press adapted to shape the peripheral region of the disc and thereafter shear the outermost periphery of the disc to form a cutting edge therearound;

Fig. 7a is a fragmentary sectional view illustrating on an enlarged scale, the die members shown in Fig. 7 at the point in the operation where the peripheral region of the disc has been upset but the shearing dies have, as yet, not performed their function;

Fig. 7b is a fragmentary sectional view similar to Fig. 7a, and illustrating the position of the shearing dies immediately after the shearing operation has taken place;

Fig. 8 is a sectional view of a die utilized for the purpose of reforming the disc and imparting the desired final curvature thereto;

Fig. 9 shows an alternative device comprising a pair of edge rolls for both tapering and upsetting the periphery of the disc;

Fig. 9a is a slightly larger scale fragmentary detail view of a portion of the rolls of Fig. 9 showing the peripheral region of the disc disposed between the edge rolls; and Fig. 10 is a fragmentary sectional view of the peripheral region of an earth working disc having a cutting edge formed thereon by the method of the present invention;

Fig. 11 is an elevational view of a modified form of die for preforming the periphery of the disc, trimming the periphery thereof and reforming the disc in a single operational sequence, this view showing the press members in the position immediately after the edge of the disc has been trimmed; and Fig. 12 is an elevational view, similar to Fig. 11, and showing the die of Fig. 11 at the end of its cycle of operation.

Referring now to the drawings, wherein like reference numerals have been used to identify identical parts in the different views, and with particular reference to Figs. 1–5, a first or preferred method of forming agricultural discs with a sheared peripheral cutting edge will be described.

In practicing the preferred method comprising the subject matter of the present invention, a substantially circular sheet steel blank of the desired thickness and diameter is formed by any well-known method, such as a punching operation and this circular blank is illustrated in Fig. 1 and designated generally by reference numeral 11. The next method step in the formation of the disc is illustrated in Fig. 2 and comprises the piercing or punching of any desired center hole 12 and any desired bolt holes 13. The holes 12 and 13 may be formed by conventional methods, and it is contemplated that they will be provided as needed.

Fig. 3 represents the method step comprising rolling a taper 14 around the periphery of the disc. The edge rolling operation illustrated schematically by Figs. 3 and 3a is brought out more clearly in Figs. 6 and 6a and will be described more completely hereinafter.

Subsequent to the formation of the taper 14 around the periphery of the disc, the peripheral portion, designated generally by reference numeral 15, of the disc is shaped so that the outer portion thereof comprises a lip disposed at a substantial angle to the central portion 16 of the disc blank 11. The disc blank 11 is then trimmed around the periphery by a shearing operation to provide a cutting edge 17. A final step in the formation of the disc is illustrated in Figs. 5 and 5a and comprises the reshaping of the entire disc blank 11 in order to impart a substantially constant radius of curvature to the disc blank.

The formation of the circular disc blank, as illustrated in Fig. 1, and the piercing of the center hole 12 and locating holes in the circular disc blank 11 are carried out in a conventional manner and need not be described in any further particularity in the present description. Turning now to Fig. 6, the edge rolling operation illustrated in Figs. 3 and 3a will be described in greater detail. The circular disc blank 11 is mounted for rotation with its center disposed on a vertical axis 18. A pair of edge rollers 19 and 20 are suitably mounted on driving spindles 21 and 22, respectively. The outer periphery 23 of roller 20 is substantially cylindrical whereas the outer periphery 24 of the roller 19 is tapered slightly, as indicated at 25. The two rollers 19 and 20 are urged towards one another with substantial force and upon rotation of the rollers, with the peripheral portion 15 of the disc blank 11 disposed therebetween, the tapered portion 25 of roller 19 and the outer periphery 23 of the roller 20 function to form a peripheral taper 14 around the periphery of the disc, it being understood that upon rotation of the rollers 19 and 20 the disc blank 11 rotates on axis 18.

It will be understood that the edge rolling means is illustrated schematically in Figs. 6 and 6a and it is not deemed essential to go into any further detail in connection with this method step.

Turning now to Fig. 7, there is illustrated therein, a die arrangement in a press for die forming the peripheral portion 15 of the disc 11 and for shearing the periphery of the disc 11 at an angle sufficiently acute to provide the cutting edge 17 around the disc periphery at the juncture between the sheared surface and the under or concave side of the disc 11.

The die arrangement located in a press shown in Fig. 7 comprises a substantially stationary base or bed plate 26 which supports a structure designated by reference numeral 27. The structure 27 comprises a fixed shearing ring 28 and a fixed shaping or die forming member 29. The shaping member 29 is secured to the stationary structure 27 by means of suitable bolts 30 and the structure 27 is secured to the bed plate 26 by means of suitable bolts 31.

A disc positioning member 32 is disposed concentrically within the die forming member 29 and comprises a central portion 33 which may be provided with any desired indexing mechanism for accurately locating the disc blank 11 with respect to the die forming member 29. The locating member 33 may be secured to the positioning member 32 by bolts 34.

The die shown in Fig. 7 comprises an upper movable member 35 to which is secured a die positioning plate 36. The die positioning plate 36 is formed with suitable shoulders 37 for accurately positioning a ring 38 which is secured to the member 36 by means of suitable bolts 38a. The ring 38 carries an upper shearing ring 39 adapted to cooperate with the lower shearing ring 28 in order to trim the periphery of the disc and the ring 38 also serves to concentrically mount a die forming or shaping member 40 with respect to the other parts of the upper or movable press member. The die forming or shaping member 40 is provided with a plurality of apertures 41 and a like number of apertures 42 are formed in member 36 immediately opposite the openings 41. Heavy duty compression springs 43 are disposed within openings 41 and 42 and serve to transmit force downwardly from the movable upper press member 35 to the die forming or shaping member 40.

When the upper press member 35 is in its raised position the compression springs 43 function to retain the die forming member 40 in its downward position with shoulders 44 resting on upper die member 39. Thus, upon initial downward movement of the press member 35 the die forming member 40 moves downwardly and a concavely curved under portion 45 of die forming member 40, in cooperation with a complementary convexly curved die forming portion 46 on the lower die forming member 29, functions to shape the peripheral region or portion 15 of the disc blank 11 to conform to the complementary shaped surfaces on die forming members 40 and 29.

When the downwardmost point of advance of die forming member 40 is reached, the further downward movement of press member 35 causes ring 38 and upper shearing member 39 to progress further downwardly and these two members successively function, as illustrated in Figs. 7a and 7b, to shear the periphery of the disc blank 11 at a sufficiently acute angle to shear the periphery of the disc blank 11 along a substantially cylindrical sheared surface 47 which intersects the under side 48 of disc 11 at an angle which is sufficiently acute to form an earth cutting edge around the periphery of the disc.

In one operative embodiment of the structure shown in Fig. 7, the angle of intersection between the sheared surface 47 and the under surface 48 of the disc blank 11 is of the order of magnitude of approximately between 25° and 30°.

The peripheral portion of the disc 11, which is trimmed off by the mutual cooperation of the complementary shearing members 39 and 28, is designated by reference numeral 49 and forms a ring surrounding the shear member 28. In the operation of the die shown in Fig. 7, after the upper movable member 35 reaches the limit of its downward movement and has completed shaping the peripheral portion 15 of the disc and shearing the peripheral edge of the disc, the upper portion 35 is withdrawn and carries with it all of the associated movable portions of the press. During the cycle of operation a plurality of plungers 50 automatically rise in order to raise an ejector ring 51 which raises the scrap ring 49 to a position where it can be removed from the press. Similarly, after the movable portion of the press is raised, another group of plungers 52 are actuated to raise the disc positioning member 32 and thereby free the disc from shaping member 29.

With particular reference to Figs. 7a and 7b, it will be noted that the lower die forming member 29 supports the peripheral region 15 of the disc throughout the entire disc periphery and as the shear member 39 approaches the complementary shearing member 28 the under side of the disc periphery is supported at all points therearound. As a result, the shearing members 39 and 28 function to initially compress the periphery of the disc with a force sufficient to shear the disc periphery along surface 47.

The sheared surface 47 at the edge of the disc is, for all practical purposes, substantially a cylindrical surface disposed approximately perpendicular to the central portion 16 of the disc 11. It will be noted that the shaping surfaces 45 and 46 on the upper and lower die forming members 40 and 29, respectively, have a configuration such that at the moment of impact between the upper shearing member 39 with the supper surface of the disc 11, the disc periphery makes an angle of the order of 60° with respect to the central portion 16 of the disc. This angle is designated by the symbol α. It is important that the lower die forming member 29 rigidly support the periphery of the disc 11 at all points therearound as such support is necessary in order that the sheared surface 47 will be at the desired acute angle at all points around the disc periphery.

It will be understood that the die shown in Fig. 7 is for the purpose of illustrating the invention and it is contemplated that, if desired, the die members 28 and 29 may be water cooled.

Upon removal of the disc blank 11 from the die shown in Fig. 7, after the cutting edge 53 at the juncture between surfaces 47 and 48 is formed around the periphery of the disc, the disc is placed in a reforming or reshaping press shown in Fig. 8. This reform press comprises a stationary die forming member 60 secured to a base plate 61 and an upper movable die forming member 62. An annular wear resistant ring 63 may be disposed around the edge of member 60, which may be replaced when undue wear is caused thereto. It will be noted that the upper and lower die forming members 62 and 60 are substantially complementary to each other and that they are so shaped that they will impart a substantially frustospheroidal shape to the disc 11 when the upper member 62 is moved down against the lower member 60 with the disc disposed therebetween. Thus, substantially all points on the surface of the disc 11 have approximately the same radius of curvature and in most instances, this radius of curvature is of the same relative order of magnitude as the diameter of the disc.

After the upper die forming member 62 is retracted a plurality of ejector pins 64 may be actuated in order to remove the disc 11 from the lower die forming member 60.

Fig. 10 shows, in fragmentary form, the peripheral region of the completed disc 11. The completed disc is formed with the peripheral taper 14 and with a cutting edge 53 at the juncture between continuously curved surface 47 and the under or concave surface 48 of the disc 11. The angle of intersection between surface 47 and surface 48 in the vicinity of edge 53 is designated by reference character β and this angle is of the order of magnitude of 25° to 30° in one preferred form. It will be noted that the angles α and β are approximately complementary to each other, the angle β being slightly greater than the actual complementary angle due to the fact that some clearance must be provided between shear members 39 and 28 and, as a result, the surface 47 is not precisely a cylindrical surface.

Turning now to Figs. 9 and 9a, suitable structure is illustrated to provide a slight variation in the method illustrated in the other figures and described heretofore. In Fig. 9, a pair of edge rollers 70 and 71 are suitably mounted upon driving shafts 72 and 73, respectively. The roller 70 is provided with an angled portion 74 adapted to cooperate with an angled portion 75 on roller 71. When the disc blank 11 is mounted on a vertical axis 76 parallel to the planes of rotation of rollers 70 and 71, the surfaces 74 and 75 function to simultaneously taper the peripheral region 15 of the disc 11 and shape the peripheral region of the disc 11. Thus, the next operation following the simultaneous tapering and shaping of the disc periphery 15 need only trim or shear the periphery of the disc, as is performed by shearing members 29 and 28 illustrated in Figs. 7a and 7b.

Turning now to Figs. 11 and 12, a modified press will be described. It will be noted that the die shown in Figs. 11 and 12, in one cycle of operation, is capable of performing all of the operations illustrated in Figs. 4 and 5. In other words, the press shown in Fig. 11 first preforms the disc periphery in order to impart the proper shape to the edge of the disc so that the die members may shear the periphery of the disc to form the cutting edge therearound and thereafter the press functions to reform the disc in order to impart the desired frustospheroidal configuration thereto.

The die shown in Figs. 11 and 12 will now be described in detail. This press comprises a base or bed plate 80 which is stationary and which is provided with an annular shoulder 81 for positioning a lower shaping and shearing ring 82. A central shaping member 83 is concentrically disposed within the ring 82 and is provided with a suitable disc positioning stud or plug 84 for centralizing the disc blank 11. The shaping member 83 is movable upwardly from the position shown in Fig. 11 to the position shown in Fig. 12 by means of a plurality of plunger pins 85 which may be actuated by any means conventionally employed in presses.

The die shown in Figs. 11 and 12 also comprises an upper or movable portion, designated generally by reference numeral 86, comprising pressure plate 87 to which is secured a ring 88 having an upper shearing ring 89 secured thereto. The ring 88 is provided with an annular inwardly projecting shoulder 90 and concentrically positions an upper disc shaping member 91. The upper disc shaping member 91 is formed with an annular outwardly projecting shoulder 92 adapted to cooperate with the inwardly projecting shoulder on the ring 88 in order to withdraw the shaping member 91 upon retraction of the pressure plate 87. A plurality of compression springs 93 are operably disposed between the pressure plate 87 and the upper shaping member 91 and these springs 93 function to urge the shaping member 91 downwardly with respect to the ring 88.

In the operation of the die shown in Figs. 11 and 12, assuming that the disc blank has already had its peripheral edge tapered by means such as is shown in Figs. 6 and 6a, the disc blank is placed in the press of Fig. 11 with the lug 84 disposed in the center hole 12 of the disc blank. The movable press member 86 is moved downwardly until the upper shaping member 91 strikes the periphery of the disc blank 11 and the rather sharply concavely curved peripheral region of the concave bottom surface 94 of the upper shaping member 91 cooperates with member 82 in order to preform the disc blank 11 and thus form the periphery of the disc blank 11 so that it makes an acute angle with the main portion of the disc blank 11. Upon further downward advance of the movable press member 86, the upper shearing ring 89 engages the upper peripheral surface of the disc 11 and cooperates with the member 82 to shear the periphery of the disc blank 11 at an acute angle to thus form the cutting edge therearound. The movable pressure member 87 descends to the position shown in Fig. 12 and thereafter the plungers 85 are advanced upwardly in order to move the lower shaping member 83 upwardly. The disc blank 11 is thus compressed between the lower shaping member 83 and the upper shaping member 91 and the configuration of the disc blank is thus changed to the desired finished shape.

It will be noted that during the movement of the shaping member 83 upwardly the blank 11 is pulled inwardly so that the peripheral portion thereof is withdrawn from the outer periphery of the shearing member 82 and thus, not only is the central portion of the disc blank 11 reformed from a flat blank to a frustospheroidal shape, but also the peripheral portion of the blank is reformed to provide substantially less concavity around the periphery of the disc.

It is contemplated that numerous changes and modifications may be made in the present invention without departing from the spirit or scope thereof.

I claim:

1. The steps in the method of forming a sheet metal earth working disc comprising forming a substantially circular flat sheet metal blank, shaping the blank substantially uniformly around the periphery thereof to provide a peripheral lip disposed at an acute angle to a central region of the blank, shearing in a direction substantially perpendicular to said central region the outermost edge of said peripheral lip along a substantially cylindrical surface disposed substantially at a right angle to the central region of the blank to provide a peripheral cutting edge around the blank, and reshaping the entire blank to provide a disc having substantially the same radius of curvature at all points thereof.

2. The steps in the method of forming a sheet metal earth working disc comprising forming a substantially circular flat sheet metal blank, shaping the blank substantially uniformly around the periphery thereof to provide a peripheral lip disposed at an angle of greater than 45° from a central region of the blank, shearing by a single shearing stroke of complementary die members the outermost edge of said peripheral lip along a substantially cylindrical surface disposed substantially at a right angle to the central region of the blank, said cylindrical surface intersecting one side of the disc at an acute angle of less than 45° so as to provide a peripheral earth cutting edge around the blank, and reshaping the entire blank to provide a disc having substantially the same radius of curvature at all points on said one side thereof.

3. The steps in the method of forming a sheet metal earth working disc comprising forming a substantially circular flat sheet metal blank, shaping the blank substantially uniformly around the periphery thereof to provide a tapered peripheral lip disposed at an acute angle to a central region of the blank, shearing in a direction substantially perpendicular to said central region the outermost edge of said tapered peripheral lip along a substantially cylindrical surface disposed substantially at a right angle to the central region of the blank to provide a peripheral cutting edge around the blank, and reshaping the entire blank to provide a disc having substantially the same radius of curvature at all points thereof.

4. The steps in the method of forming a sheet metal earth working disc comprising forming a substantially circular flat sheet metal blank, rolling the peripheral edge of the blank to provide a taper therearound, shaping the blank substantially uniformly around the tapered periphery thereof to provide a peripheral lip disposed at an acute angle to a central region of the blank, shearing in a direction substantilaly perpendicular to said central region the outermost edge of said peripheral lip along a substantially cylindrical surface disposed substantially at a right angle to the central region of the blank to provide a peripheral earth cutting edge around the blank, and reshaping the entire blank to provide a disc having substantially the same radius of curvature at all points thereof.

5. The steps in the method of forming a sheet metal earth working disc comprising forming a substantially circular flat sheet metal blank, die-forming the blank substantially uniformly around the periphery thereof to provide a peripheral lip disposed at an acute angle to a central region of the blank, shearing the outermost edge of said peripheral lip along a substantially cylindrical surface disposed substantially at a right angle to the central region of the blank to provide a continuous sheared peripheral cutting edge around the blank, and die-forming the entire blank to provide a disc having substantially the same radius of curvature at all points thereof.

6. The steps in the method of forming a sheet metal earth working disc comprising the steps of forming a substantially circular flat sheet metal blank, rolling the peripheral edge of the blank to provide a taper therearound, die-forming the blank substantially uniformly around the periphery thereof to provide a peripheral lip disposed at an acute angle to a central region of the blank, shearing the outermost edge of said peripheral lip along a substantially cylindrical surface disposed substantially at a right angle to the central region of the blank to provide a continuous sheared peripheral earth cutting edge around the blank, and die-forming the entire blank to provide a disc having substantially the same radius of curvature at all points thereof.

7. The steps in the method of forming a sheet metal earth working disc comprising the steps of forming a substantially circular flat sheet metal blank, rolling the blank substantially uniformly around the periphery thereof to provide a tapered peripheral lip disposed at an acute angle to a central region of the blank, shearing in a direction substantially perpendicular to said central region the outermost edge of said peripheral lip along a substantially cylindrical surface disposed substantially at a right angle to the central region of the blank to provide a peripheral earth cutting edge around the blank, and die-forming the entire blank to provide a disc having substantially the same radius of curvature at all points thereof.

8. The steps in the method of forming a sheet metal earth working disc comprising forming a substantially circular flat sheet metal blank, shaping the blank substantially uniformly around the periphery thereof to provide a peripheral lip disposed at an acute angle of the order of 60° with reference to a central region of the blank, shearing in a direction substantially perpendicular to said central region the outermost edge of said peripheral lip along a substantially cylindrical surface disposed substantially at a right angle to the central region of the blank to provide a peripheral cutting edge around the blank, and reshaping the entire blank to provide a disc having substantially the same radius of curvature at all points thereof.

References Cited in the file of this patent

UNITED STATES PATENTS

| | | |
|---|---|---|
| 849,329 | Colthar | Apr. 2, 1907 |
| 2,291,722 | Ingersoll | Aug. 4, 1942 |
| 2,705,448 | Ingersoll | Apr. 5, 1955 |